United States Patent
Ashrafi

(10) Patent No.: US 6,574,539 B1
(45) Date of Patent: Jun. 3, 2003

(54) STEERING WHEEL TORQUE-BASED DETECTION OF MISALIGNMENT OF A VEHICLE'S STEERING SYSTEM

(75) Inventor: Behrouz Ashrafi, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/742,194

(22) Filed: Dec. 20, 2000

(51) Int. Cl.[7] .............. B62D 6/00; G05D 1/00; G06F 17/00; G06F 19/00; G06F 7/00
(52) U.S. Cl. .............. 701/41; 701/35; 180/422; 342/71; 702/104; 700/279; 356/155
(58) Field of Search .............. 701/41, 37, 23, 701/99, 205, 123, 24, 117, 29, 50, 208, 96, 35, 36; 180/443, 441, 446, 422, 429, 168, 418, 400, 415; 33/203.13, 288, 203, 203.18, 600, 203.17; 342/71; 702/104; 340/438, 506; 700/279; 356/139.09, 155

(56) References Cited

U.S. PATENT DOCUMENTS

| | | | |
|---|---|---|---|
| 3,597,728 A | | 8/1971 | Kurtz |
| 4,393,694 A | | 7/1983 | Marten et al. |
| 4,835,714 A | | 5/1989 | Sano et al. |
| 4,847,769 A | * | 7/1989 | Reeve ............ 180/168 |
| 5,026,081 A | | 6/1991 | Bauer |
| 5,530,648 A | * | 6/1996 | Lavey ............ 180/446 |
| 5,731,870 A | * | 3/1998 | Bartko et al. ....... 33/203.16 |
| 5,787,375 A | * | 7/1998 | Madau et al. ......... 180/400 |
| 5,790,966 A | * | 8/1998 | Madau et al. ......... 180/400 |
| 5,878,361 A | * | 3/1999 | Sekine et al. ........ 701/208 |
| 5,878,362 A | * | 3/1999 | Sekine et al. ......... 342/71 |
| 5,928,299 A | * | 7/1999 | Sekine et al. ........ 701/208 |
| 5,941,338 A | * | 8/1999 | Miller et al. |
| 5,988,311 A | | 11/1999 | Kuribayashi et al. |
| 6,070,684 A | * | 6/2000 | Shimizu et al. ....... 180/204 |
| 6,098,296 A | * | 8/2000 | Perisho et al. ......... 33/203 |
| 6,129,170 A | * | 10/2000 | Hickman et al. ...... 180/418 |
| 6,208,240 B1 | | 3/2001 | Ledesma |
| 6,313,758 B1 | * | 11/2001 | Kobayashi ........... 340/436 |

FOREIGN PATENT DOCUMENTS

| | | |
|---|---|---|
| DE | 4307304 C | 3/1994 |
| EP | 0822130 A | 2/1998 |
| EP | 1078844 A | 2/2001 |
| WO | WO 96/37375 A | 11/1996 |

* cited by examiner

*Primary Examiner*—Thomas G. Black
*Assistant Examiner*—Ronnie Mancho
(74) *Attorney, Agent, or Firm*—John E. Kajander

(57) ABSTRACT

A misalignment detection system (12) for steering systems of an automotive vehicle (10) includes a logic device (14) coupled to a vehicle speed sensor (18) and a steering wheel angle sensor (20). The logic device is also coupled to a memory (16) that is used to store a steering wheel ratio map and a historic steering wheel angle or a wheel angle value derived from an automobile manufacturer's wheel alignment specification. The logic device (14) compares the signal from the steering wheel angle sensor (20) with the stored value of either the historic steering wheel angle or the value derived from the manufacturer's alignment specifications at a given vehicle speed to determine error. An indicator (28) may provide an indication to the vehicle operator to signal the presence of the misalignment condition of the steering system.

6 Claims, 2 Drawing Sheets

STEERING WHEEL TORQUE-BASED DETECTION OF MISALIGNMENT OF A VEHICLE'S STEERING SYSTEM

TECHNICAL FIELD

The present invention relates generally to steering systems for automotive vehicles, and more particularly, to a misalignment detection system for the steering system.

BACKGROUND

Automotive vehicles depend on aligned wheels for smooth travel and predictable steering efforts, as well as even wear of tires and related suspension parts. During operation of an automotive vehicle, the steering system may become misaligned. Several patents relating to road wheel alignment and alignment adjustment include U.S. Pat. No. 5,988,311 Electric Steering Actuator; U.S. Pat. No. 5,941,338 Vehicle Steering Correction System; U.S. Pat. No. 5,026,081 Rear Wheel Steering System Having Toe Error Compensation; U.S. Pat. No. 4,835,714 Wheel Alignment Control System For Vehicles; U.S. Pat. No. 3,597,728 Means of Instantly Detecting Anomalies On A Moving; U.S. Pat. No. 5,790,966 Method for Determining Steering Position of Automotive Steering Mechanism; and U.S. Pat. No. 5,787,375 Method for Determining Steering Position of Automotive Steering Mechanism. Vehicle Misalignment can occur in an automotive vehicle for various reasons. Driving over potholes, road debris, curbs or rough roads can cause the adjusting mechanisms or the actual vehicle structure itself to change, resulting in steering system misalignment.

A misalignment in the present application refers to a misalignment of the steered or road wheels with respect to their alignment specifications as provided by the vehicle manufacturer. Misalignment can manifest itself through increased steering efforts or, if allowed to continue, as increased tire and suspension bushing wear. Misalignment can also result in unpredictable and hazardous vibrations and steering efforts. Until the tires or bushings exhibit noticeable wear or the vehicle exhibits shudders at certain speeds, misalignment is often difficult to detect. Once the wear is noticeable on the tires or bushings or the vehicle shudders unpredictably, the damage is unfortunately already done.

It would therefore be desirable to provide a misalignment detection system for an automotive vehicle that signals the driver to the presence of misalignment so that corrective actions may be taken.

SUMMARY OF THE INVENTION

The present invention provides a misalignment detection system for a steering system of an automotive vehicle, which includes a vehicle speed sensor, steering wheel torque sensor, a steering wheel angle sensor, a lateral acceleration sensor, a yaw rate sensor, and a memory/logic device. A vehicle speed sensor generates a vehicle speed signal indicative of the speed of the vehicle. A steering wheel torque sensor generates a wheel torque signal indicative of the torque applied to the steering wheel by the driver. A steering wheel angle sensor generates a steering wheel angle signal indicative of the angle induced into the steering wheel by the driver. A lateral acceleration sensor generates a lateral acceleration signal indicative of the lateral acceleration experienced by the vehicle. A yaw rate sensor generates a signal indicative of the yaw rate of the vehicle. A memory device stores previous sensor history and/or a steering angle value derived from alignment specifications provided by the automobile manufacturer. A logic device analyzes various sensor signals to determine whether misalignment exists or not. In its most basic form, the system uses the yaw rate and lateral acceleration sensors to determine whether the vehicle is being driven in a substantially straight line and if so, then looks at the signal from the steering wheel torque sensor to determine if the operator is having to adjust the wheel to maintain this straight line motion. If the driver input correction as detected by the steering wheel torque sensor value exceeds a predetermined level while the vehicle is traveling in a straight line, misalignment exists. The logic device can also be fashioned so as to apply simple logic functions to the various signal values to rule out other explanations for the error value, such as road bank and crown.

One feature of the present invention is that upon a predetermined amount of error, the vehicle operator may be presented with an indicator to inform him of the misalignment.

In one aspect of the invention, a method for determining misalignment comprises the steps of:
 detecting a vehicle speed;
 determining an empirical steering wheel angle derived from yaw rate, vehicle speed and a steering ratio map;
 determining if vehicle is driving in a substantially straight line;
 if so, then sensing a steering wheel applied torque;
 determining an error between the steering wheel applied torque signal and the stored steering wheel torque signal when driving substantially straight; and
 indicating a misalignment condition if the error is above a predetermined level.

In another aspect of the present invention, various other vehicle condition sensors are used to check the error to insure it is accurate. Such vehicle condition sensors include (but are not limited to) a vehicle lateral acceleration sensor, a vehicle yaw rate sensor and a steering wheel angle sensor.

In another aspect of the present invention, the misalignment detection system can be used to adjust the alignment in electrically steered vehicles that have independent actuators to adjust the steered road wheels.

One advantage of the invention is that by signaling the vehicle operator of a misalignment, excessive wear of the vehicle's tires and bushings can be reduced by corrective action. Another advantage of the invention is that diagnosis of misalignment no longer would rely on expensive machines and labor by a trained technician. This will result in reduced diagnosis costs to the vehicle owner. The misalignment detection system may store specific information from the various vehicle condition sensors in an on-board diagnostic system for downloading by a technician. This information may be able to help guide the technician to specific mechanical adjustments to be made to correct the misalignment, thus further reducing the costs of corrective action. Yet another advantage of the invention is that many of the sensors can be used by other systems of the vehicle. Therefore, implementation of a misalignment detection system may be done in a cost efficient manner.

Other objects, features and advantages of the invention will become apparent when viewed in the light of the detailed description of the preferred embodiment when taken in conjunction with the attached drawings and appended claims.

DETAILED DESCRIPTION OF THE PREFERRED EMBODIMENT

Figure 1:
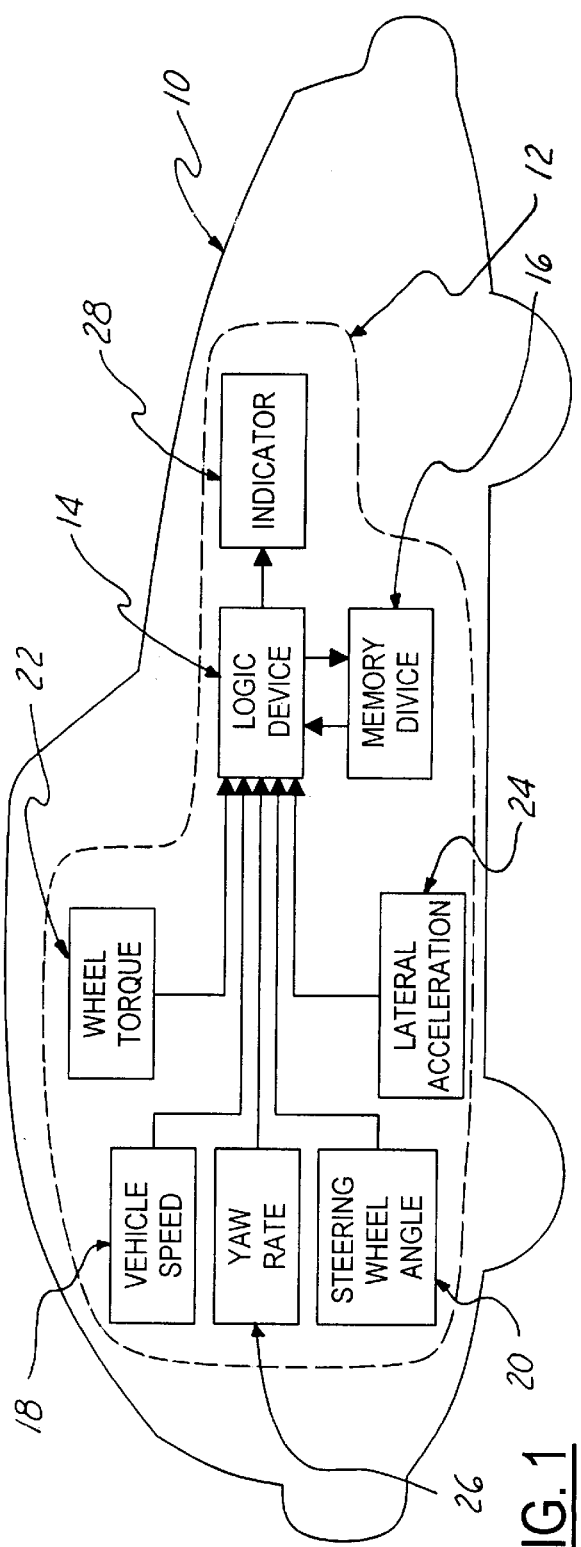
FIG. 1 is a block diagram view of a misalignment detection system according to the present invention.

In the following figures, the same reference numerals will be used to identify the same components in the various views. The present invention is illustrated with respect to the misalignment system for an automotive vehicle. It should be understood that the present invention might share various sensors and inputs with various other systems of the automotive vehicle.

The following table is provided as an aid in referring to the various features in FIG. 1:

Automotive Vehicle 10
Misalignment Detection System 12
Logic Device 14
Memory Device 16
Vehicle Speed Sensor 18
Steering Wheel Angle Sensor 20
Steering Wheel Torque Sensor 22
Lateral Acceleration Sensor 24
Yaw Rate Sensor 26
Indicator 28

Referring now to FIG. 1, an automotive vehicle (10) has a misalignment detection system (12) located therein. The misalignment detection system (12) has a logic device (14) that is used to receive various pieces of information and perform calculations and logic functions to determine whether the steering system is misaligned.

The logic device (14) is preferably microprocessor-based. Although a dedicated logic device (14) may be used in a misalignment detection system (12) the logic device (14) may be part of another system such as the steering control system of the vehicle. Further, the logic device (14) may also be part of a dynamic control system of the vehicle (10).

The logic device (14) is coupled with a memory device (16). Although shown as a separate component, the memory device (16) may be incorporated into the logic device (14) or into another memory device used in the automotive vehicle, (10). The memory device (16) may be a combination of ROM and RAM or other types of memory. The memory device (16) is suitable for storing steering ratio memory maps, various other memory maps and/or various other vehicle parameters and/or signals as will be described below.

The logic device (14) is coupled to a vehicle speed sensor (18). The vehicle speed sensor (18) provides an indication to the logic device (14) of the vehicle velocity in the longitudinal direction of the vehicle. The vehicle speed sensor (18) may comprise a variety of devices or systems commonly employed in automotive vehicles. One type of vehicle speed sensor (18) suitable for use with a system according to the present invention comprises a speed module for receiving inputs from multiple speed sensors adapted to indicate the speeds of the individual wheels. The speed module derives a longitudinal vehicle speed signal by combining and averaging the signals from the wheel speed sensors. The individual wheel speeds may be ascertained using pulse generators disposed at each wheel.

A steering wheel angle sensor (20) is coupled to the memory device (16). The steering wheel angle sensor provides an indication of the steering wheel rotational angle induced by the driver. Various types of steering angle sensors may be employed. Suitable steering angle sensors may include rheostats or pulse generators.

A steering wheel torque sensor (22) is also coupled to the memory device (16). The steering wheel torque sensor provides an indication of the steering wheel torque induced by the driver. Various types of steering wheel torque sensors may be employed.

A lateral acceleration sensor (24) is also coupled to the memory device (16). The lateral acceleration sensor provides an indication of the lateral acceleration of the automotive vehicle (10).

A yaw rate sensor (26) is also coupled to the memory device (16). The yaw rate sensor (26), generates a yaw rate signal indicative of the vehicle yaw rate. Various types of yaw rate sensors may be employed. Suitable yaw rate sensors may include piezoelectric or silicon micro-machined devices.

The logic device (14), and/or the memory device (16) may be coupled to an indicator (28) to indicate the misalignment condition to the driver. The indicator (28) may be a malfunction indicator light present on an instrument panel of the vehicle. The indicator (28) may also be an LCD display present within the vehicle. Further, the indicator (28) may be a service diagnostic connector so that a service technician with the proper equipment may monitor the information from the logic device (14) and/or the memory device (16).

Figure 2:
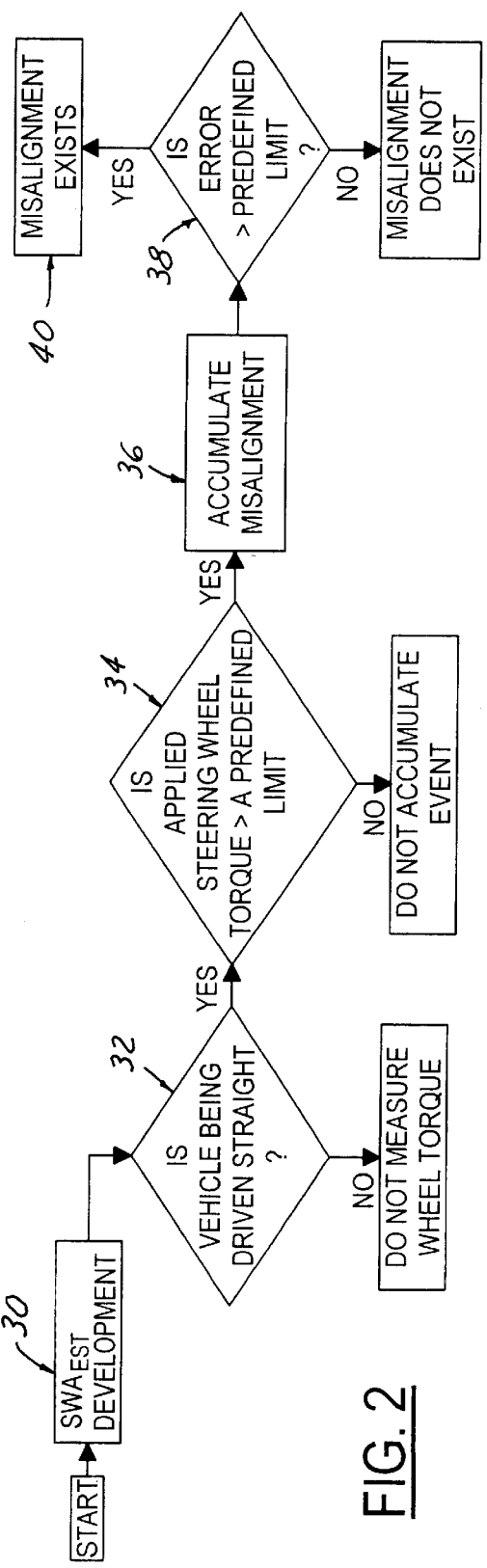
FIG. 2 is a functional flow chart of a misalignment detection system according to the present invention utilizing the straight line driving method and a steering wheel torque sensor.

The following table is provided as an aid in referring to FIG. 2:

Level III SWAest developed 30
Straight line motion determined 32
Applied wheel torque analyzed 34
Misalignment events accumulated 36
Accumulated events compared to error limit 38
Misalignment determined 40

A functional block diagram of the misalignment detection system of the present invention is illustrated. The process is initiated upon the occurrence of some event, which could include the passage of a certain period of time while the ignition is keyed on, or the lack of a change in the steering wheel torque signal for a period of time. In block 30, the logic device collects data relevant to whether the vehicle is being driven in a substantially straight line. A level III Steering Wheel Angle Estimate (SWAest) is developed that signifies whether the vehicle is traveling in a straight line. In block 32, the Level III SWAest value is compared to the ideal value of the Level III Steering Wheel Angle when the vehicle is traveling in a straight line. If the SWAest does not substantially match the ideal, straight-line motion value of the Steering Wheel Angle, then no further action is taken until the process starts again. If the SWAest does substantially match the ideal, straight-line Steering Wheel Angle, then the Steering Wheel torque is analyzed. In block 34, the Steering Wheel Torque Sensor signal is analyzed to determine if it exceeds a predetermined limit of the Steering Wheel Torque Sensor signal which is stored in memory. The predetermined limit to the Steering Wheel Torque Sensor signal is a value such that significant or objectionable driver effort is required to induce a torque at the steering wheel when the vehicle is traveling in a straight line. If the value of the Steering Wheel Torque Sensor signal does not exceed the predetermined limit, no further action is taken until the process starts again. If the value of the Steering Wheel Torque Sensor Signal exceeds this predetermined limit the misalignment event is accumulated into memory in block 36.

In block 38, the accumulated error is compared to a predefined limit of accumulated error stored in memory. The accumulated error in block 36 may be subject to a numerical filtering scheme as would be evident to those skilled in the art. This filtering scheme may be performed over multiple trigger events (such as ignition cycles) to avoid any false detection of misalignment. In addition, qualities of the error value, such as the magnitude, rate of increase or sign (positive or negative), can be analyzed in the context of other vehicle condition signals, such as wheel torque, vehicle speed, or lateral acceleration, to provide more refined diagnostic information to be stored in the memory device (16) for use later by an automotive technician. If the accumulated error is greater than a predefined limit, then block 40 recognizes that the misalignment condition exists. If this occurs, an indication, such as through the indicator (28) may be provided.

Figure 3:
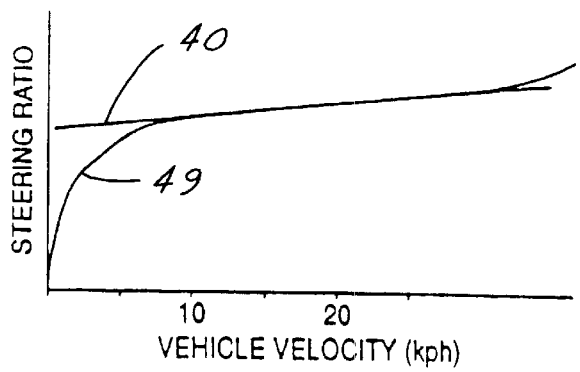
FIG. 3 is a plot of steering wheel ratio as a function of vehicle velocity at a particular steering wheel angle.

Referring now to FIG. 3, the following description is based on the steering wheel angle and the steering ratio. The logic device can estimate the steering wheel angle of the vehicle at a predetermined threshold during straight-line motion of the vehicle.

The function of a center find algorithm is to estimate the steering wheel angle relative to the angle that will make the vehicle travel along a straight line. This estimation can be obtained from the following relationship:

$$\text{Steering Wheel Angle} = \text{Steering Ratio} * \theta_f * 57.295 \quad \text{(Equation 1)}$$

where $\theta_f$ is the average of the front tire steer angles.

The steering ratio in the above equation represents a map that is developed from experimentally obtained data or derived from the original automotive manufacturer's specifications. Thus the specific data for various vehicles having different steering systems may vary. Note that if the steering ratio is known or is approximated reasonably well, knowing $\theta_f$ from the values of the yaw rate, vehicle speed and lateral acceleration, one can get an accurate estimate of the vehicle steering wheel angle that would result in these dynamic values.

For example, the average of the front tire steer angles, $\theta_f$, can be computed from $$\theta_f = r/u * [L + K_{us}/g * u^2] \quad \text{(Equation 2)}$$

where r=rate of the vehicle (rad/s)

L=wheel base (m)

$K_{us}/g$=understeer coefficient of the vehicle (g=force of gravity)

u=longitudinal velocity of the vehicle (meters per second) and with a map for the steering ratio, Equation 1 can be used to determine an estimate of the steering wheel angle. Therefore, one can quantify the variations of the steering ratio as a function of vehicle speed and steering wheel angle (or the corresponding average of front tire steer angle).

To quantify these variations, vehicle testing is performed and the yaw rate, vehicle speed, lateral acceleration and steering wheel angle are measured. Next, the yaw rate, vehicle speed and other vehicle parameters are substituted into Equation 2 to solve for the average front tire steer angle, $\theta_f$. Finally, having measured the steering wheel angle, Equation 1 can be used to solve for the steering ratio, namely, $$\text{Steering Ratio} = \text{Measured Steering Wheel Angle}/\theta_f \quad \text{(Equation 3)}$$

Note that a table can be generated for the steering ratio that corresponds to various 'measured steering wheel angle positions'. A typical plot of the steering ratio at one particular steering wheel angle is shown in FIG. 3.

The non-linear relationship between the steering ratio and vehicle velocity can be approximated by a linear equation as shown in FIG. 3. Therefore, the steering ratio can be represented by the following linear equation $$\text{Steering Ratio} = m * \text{vehicle velocity} + b \quad \text{(Equation 4)}$$

Where m and b are the slope and y-intercept of the linear fit (48) through the steering ratio vs. vehicle velocity curve (49) of FIG. 3.

Figure 4:
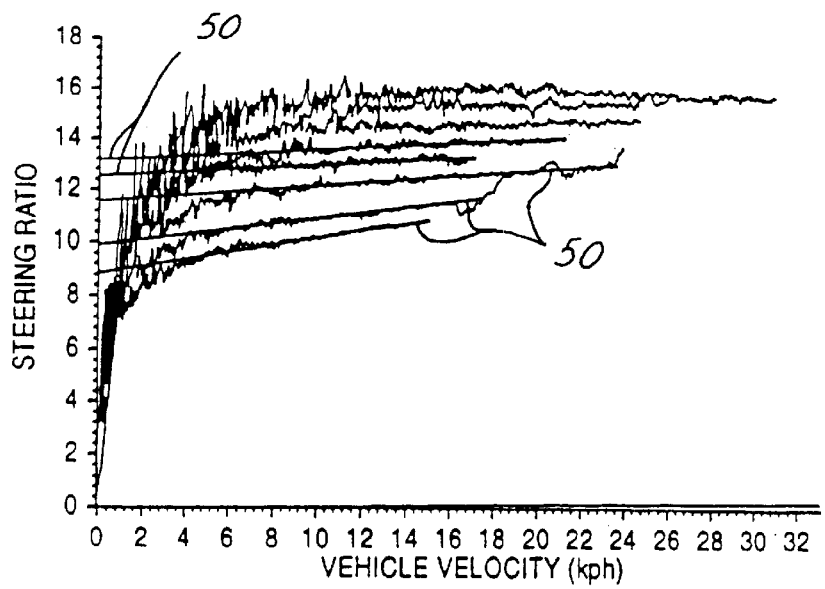
FIG. 4 is a plot of steering wheel ratio as a function of vehicle velocity for several steering wheel angles.
Figure 5:
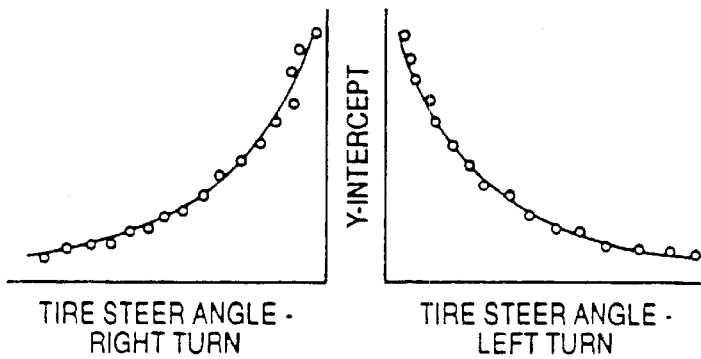
FIG. 5 is a plot of the y-intercept for a system function of front tire steer angle for a system according to the present invention.

This relationship is quantified experimentally for all steering wheel angles. By way of example, the vehicle's yaw rate, speed and measured steering wheel angle are measured at 20 degree increments from the left-most steering travel position (left lock) to the right-most steering travel position (right lock), resulting in about fifty data points for angular displacement of about 1000 degrees. Next, for each data run, the average front tire steer angle, $\theta_f$, is computed and substituted in Equation 3 to solve for the steering ratio. FIG. 4 represents the steering ratio as a function of vehicle velocity for several steering wheel angles. As seen in FIG. 4, a pattern begins to emerge when going from high to low steering wheel angles. Straight lines (50), through these curves can be fit therein. For each line, as seen in the plot, there exist a unique slope and y-intercept, which can be tabulated along with their corresponding front tire steer angles. After tabulating these variables, approximately fifty data points for slope, y-intercept, and their corresponding front tire steer angle may be obtained. The slope and y-intercept data points may then be plotted against their corresponding front tire steer angles. A typical plot of the y-intercept values as a function of front tire steer angle is shown in FIG. 5.

To quantify variations of the y-intercept and slope as a function of tire steer angle, the y-intercept and slope data are fitted with polynomials of second degree. A polynomial fit through the y-intercept vs. tire steer angle is shown in FIG. 4. The curve fits for the y-intercept and slope can be represented by the following polynomials:

$$b = a_1 \theta_f^2 + a_2 \theta_f + a_3 \quad \text{(Equation 4)}$$

$$m = c_1 \theta_f^2 + c_2 \theta_f + c_3 \quad \text{(Equation 5)}$$

where b and m are the y-intercept and slope of the lines that are fitted through the steering ratio curves of FIG. 4. The coefficients $a_i$ and $c_i$ can be realized using any curve fitting algorithm. Now, the steering ratio can be expressed in terms of a linear function of speed with the slope of m and y-intercept of b which themselves are quadratic functions of the steering ratio, $\theta_f$. Recall that knowing the yaw rate and speed, the steering ratio, $\theta_f$, can be calculated from Equation 2.

To summarize, given the yaw rate and speed, $\theta_f$ can be calculated from Equation 2. Once $\theta_f$ is known, b and m can be calculated from Equations 4 and 5 with coefficients $a_i$ and $c_i$ having been realized from experimental or specified data. Then, the steering ratio can be calculated from the following equation:

Steering Ratio=$m$*vehicle speed+$b$ (Equation 6)

Note that the above equation represents the family of straight-line fits seen in FIG. 4. Now that the steering ratio has been computed, one can estimate the steering wheel angle using Equation 1. That is, Steering Wheel Angle Estimate (SWAest)=Steering ratio*$\theta_f$*57.295 (Equation 7)

The above theoretical description can be used to realize the polynomial coefficients of Equations 4 and 5. Once these coefficients have been identified for a particular vehicle configuration, the vehicle's steering wheel angle can be very accurately estimated from its speed and yaw rate. This corresponds to the Level III Steering Wheel Estimate value (Level III SWAest) referred to in FIG. 2.

In operation, a historical steering wheel angle value representing straight-line motion ($SWA_{straight-line}$) may be maintained during the operation of the vehicle (10) or inferred from vehicle specifications and stored in the memory device (16). The Level III Steering Wheel Estimate value (SWAest) is then compared with the Straight Line Steering Wheel Angle ($SWA_{straight-line}$) stored in the memory device (16) by the logic device (14). If SWAest substantially equals $SWA_{straight-line}$, then the vehicle can be considered to be traveling in a straight line. Once it is determined that the vehicle is traveling in a straight line, the logic device (14) then analyzes the Steering Torque signal (22). If the Steering Wheel Torque (22) is substantially beyond zero, the driver is imputing a torque to the steering wheel in order to travel in a straight line, and thus there may be a misalignment condition in the vehicle (10). The misalignment condition is recorded in the memory device (16) until the accumulated misalignment conditions exceed a predefined limit. If the accumulated misalignment conditions exceed the predefined limit, a misalignment condition exists. The logic device can then signal the driver through an indicator (28), store the information in memory (16) for diagnostic use or adjust the alignment of one or both of the steered wheels if the vehicle has an independently actuated electric steering system.

While particular embodiments of the invention have been shown and described, numerous variations and alternate embodiments will occur to those,skilled in the art. Accordingly, it is intended that the invention be limited only in terms of the appended claims and their equivalents.

What is claimed is:

1. A misalignment detection system for a steering system comprising:

a steering wheel torque sensor generating a steering wheel torque signal indicative of the steering torque induced in a steering wheel;

a memory capable of storing at least one predetermined steering wheel angle value and at least one predetermined steering wheel torque value; and a logic device coupled to said steering wheel torque sensor and said memory, said logic device capable of generating a steering wheel angle estimate, said logic device further capable of comparing said steering wheel angle estimate with said at least one predetermined steering wheel angle value, said logic device further capable of comparing said steering wheel torque signal with said at least one predetermined steering wheel torque value; indicating a misalignment when said steering wheel torque is required to maintain said vehicle in a condition of traveling in a substantially straight line.

2. A misalignment detection system as recited in claim 1 further comprising an indicator coupled to said logic device.

3. A misalignment detection system as recited in claim 2 wherein said indicator comprises a warning light, an audible alarm or a connector.

4. A misalignment detection system as recited in claim 2 wherein said logic device accumulates an accumulated error value over time and controls said indicator in response to said accumulated error value.

5. A misalignment detection system as recited in claim 1, further comprising a steering wheel angle sensor, wherein said logic device further determines said steering wheel angle estimate as a function of the signal from said steering wheel angle sensor and a steering ratio map.

6. A misalignment detection system as recited in claim 5 wherein said logic device determines said steering wheel angle estimate as a function of said steering wheel angle signal, a steering ratio map and one or more vehicle condition signals, each of said one or more vehicle condition signals selected from a group consisting of a lateral vehicle acceleration signal, a steering wheel torque signal, and a yaw rate signal.

* * * * *